United States Patent
Stanley et al.

(10) Patent No.: US 10,904,001 B2
(45) Date of Patent: Jan. 26, 2021

(54) DATA FORMAT-PRESERVING ENCRYPTION, TOKENIZATION, AND ACCESS CONTROL FOR VAULTLESS SYSTEMS AND METHODS

(71) Applicants: Justin Stanley, Bixby, OK (US); Jacob Burcham, Brooklyn, NY (US); Ulf Mattsson, Westport, CT (US)

(72) Inventors: Justin Stanley, Bixby, OK (US); Jacob Burcham, Brooklyn, NY (US); Ulf Mattsson, Westport, CT (US)

(73) Assignee: TOKENEX, INC., Edmond, OK (US)

( * ) Notice: Subject to any disclaimer, the term of this patent is extended or adjusted under 35 U.S.C. 154(b) by 0 days.

(21) Appl. No.: 16/421,658

(22) Filed: May 24, 2019

(65) Prior Publication Data

US 2020/0374120 A1    Nov. 26, 2020

(51) Int. Cl.
*H04L 9/32* (2006.01)
*H04L 9/06* (2006.01)
*G06F 3/06* (2006.01)

(52) U.S. Cl.
CPC .......... *H04L 9/3213* (2013.01); *H04L 9/0618* (2013.01); *G06F 3/0619* (2013.01)

(58) Field of Classification Search
CPC . H04L 9/0618; H04L 9/0894; G06F 21/6209; G06F 3/0619
USPC ........................................................ 713/159
See application file for complete search history.

(56) References Cited

U.S. PATENT DOCUMENTS

| | | | | |
|---|---|---|---|---|
| 8,588,425 | B1* | 11/2013 | Harwood | H04L 9/0894 380/286 |
| 9,094,378 | B1* | 7/2015 | Yung | H04L 9/008 |
| 2008/0130895 | A1* | 6/2008 | Jueneman | H04L 9/3252 380/277 |
| 2015/0349950 | A1* | 12/2015 | Shrimpton | H04L 9/0618 713/189 |
| 2016/0019396 | A1* | 1/2016 | Davis | G06F 21/6209 713/193 |
| 2016/0182223 | A1* | 6/2016 | Kishinevsky | G06F 12/1408 380/28 |
| 2018/0074975 | A1* | 3/2018 | Deutsch | G06F 3/0619 |

OTHER PUBLICATIONS

PCTUS2034368ISR&WO Jun. 16, 2020.

* cited by examiner

*Primary Examiner* — Bryan F Wright
(74) *Attorney, Agent, or Firm* — John M. Behles

(57) ABSTRACT

Embodiments of the present disclosure relate to vaultless format-preserving tokenization systems and methods. Some methods include encoding a first data set to produce encoded input data; generating a secure tweak for the encoded input data based on a token format schema by: encoding a tweak input to produce an encoded tweak input; and hashing the encoded tweak input along with a unique hashing key to generate the secure tweak; applying a format preserving encryption algorithm that utilizes the encoded input data, the secure tweak, and a unique encryption key to generate ciphertext output; and generating a token from the ciphertext output.

8 Claims, 5 Drawing Sheets

DATA FORMAT-PRESERVING ENCRYPTION, TOKENIZATION, AND ACCESS CONTROL FOR VAULTLESS SYSTEMS AND METHODS

CROSS-REFERENCE(S) TO RELATED APPLICATION(S)

N/A

FIELD OF THE PRESENT DISCLOSURE

The present disclosure relates generally to data security, and more specifically, but not by way of limitation, to systems and methods that provide secure, vaultless and format-preserving tokenization.

BRIEF DESCRIPTION OF THE DRAWINGS

Certain embodiments of the present disclosure are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
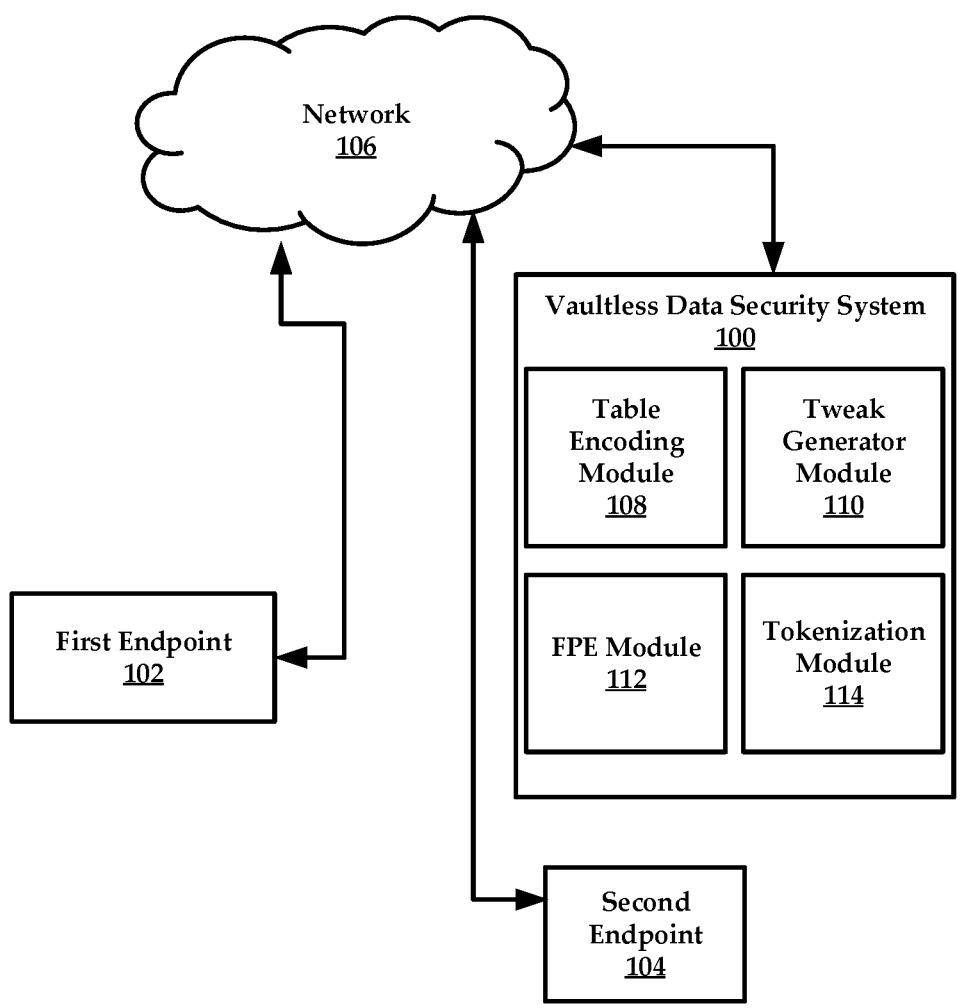
FIG. 1 is a high level schematic diagram of an environment for practicing aspects of the present disclosure.

The present disclosure is directed in general to systems and methods that provide vaultless solutions that enable data to be transmitted and stored without being compromised by a third party, while allowing no party to be required to store the data in its unprotected format. The systems and methods disclosed herein provide a vaultless implementation of data protection that can leverage both format-preserving encryption (FPE) and tokenization, hereinafter referred to as secure FPE tokenization.

For context, encryption is the process of using an algorithm to transform plain text information into a non-readable form called ciphertext. An algorithm and an encryption key are required to decrypt the information and return it to its original plain text format. Today, SSL encryption is commonly used to protect information as it's transmitted on the Internet. Using built-in encryption capabilities of operating systems or third party encryption tools, millions of people encrypt data on their computers to protect against the accidental loss of sensitive data in the event their computer is stolen. And encryption can be used to thwart government surveillance and theft of sensitive corporate data. There are two primary approaches to encryption: symmetric key and asymmetric key encryption. In symmetric key encryption, one key is used to both encrypt and decrypt the information. Symmetric key encryption is analogous to the key used to both unlock and lock the door to a house. The big drawback of this approach is that if the key is compromised, it can be used to unlock, or decrypt, all of the data it was used to secure. For this reason, asymmetric key encryption was developed to allow multiple parties to exchange encrypted data without managing the same encryption key.

Format-preserving encryption (FPE) is a special case encryption type that allows for encryption such that the output (ciphertext) is in the same format as the input (plaintext or cleartext). Embodiments of the present disclosure incorporate FPE methods and it will be understood that the systems and methods herein can utilize any FPE method that is suitable and corresponds to the requirements disclosed herein.

For context, generally speaking, vaulted tokenization is the process of turning a meaningful piece of data, such as an account number, into a random string of characters called a token that has no meaningful value to an attacker if breached. Tokens serve as reference to the original data, but cannot be used to guess those values. That's because, unlike encryption, vaulted tokenization does not use a mathematical process to transform the sensitive information into the token. There is no key, or algorithm, that can be used to derive the original data for a token. Instead, tokenization uses a database, called a token vault, which stores the relationship between the sensitive value and the token. The real data in the vault is then secured, often via encryption. These methods vary from the systems and methods disclosed herein which do not require a vaulted solution where data regarding the cleartext or token are stored.

The token value can be used in various applications as a substitute for the real data. If the real data needs to be retrieved—for example, in the case of processing a recurring credit card payment—the token is submitted to the vault and the index is used to fetch the real value for use in the authorization process.

Vaultless tokens provide a similar benefit, but rather than using a vault to store the relationship between the sensitive value and the token, lookup tables and a mathematical process is used to transform the sensitive information into the token.

The advantage of tokens is that if they are breached, they have no meaning to the attacker. Consideration can also be given to the design of a token to make it more useful. For example, the last four digits of a payment card number can be preserved in the token so that the tokenized number (or a portion of it) can be printed on the customer's receipt so she can see a reference to her actual credit card number. The printed characters might be all asterisks plus those last four digits. In this case, the merchant only has a token, not a real card number, for security purposes. Some embodiments of the present disclosure enable randomized or dynamically generated look-up tables depending on the required use case, as will be discussed in greater detail herein.

In some embodiments, the systems and methods disclosed herein are configured to utilize both FPE and tokenization to secure data for any suitable use. These and other advantages of the present disclosure will be discussed in greater detail herein with reference to the collective drawings.

FIG. 1 is a schematic diagram of an example environment where aspects of the present disclosure are practiced. In various embodiments, the environment includes a vaultless data security system (hereinafter system 100), a first endpoint 102, a second endpoint 104, and a network 106. In general, the system 100 comprises a table encoding module 108, a tweak generator module 110, an FPE module 112, and a tokenization module 114. To be sure, each of these modules can be correspondingly embodied as a plurality of servers that are networked together.

The endpoint systems 102/104 can include any systems used by one or more parties that desire to exchange data in a secure manner. The components of the environment can communicatively couple with one another over the network 106. The network can include any one or a combination of multiple different types of networks, such as cable networks, the Internet, cellular networks, wireless networks, and other private and/or public networks. In some instances, the network may include cellular, Wi-Fi, Wi-Fi direct, or other equivalent systems/protocols.

Broadly described, in some embodiments, the system 100 is configured to receive cleartext, or even a portion of cleartext, process the cleartext using both FPE and tokenization to produce a token. Stated otherwise, the system 100 can tokenize sensitive data to prevent unauthorized access to that data from malicious actors and any unauthorized users. The system 100 utilizes a format-preserving encryption algorithm, a unique encryption key for use in the FPE algorithm, a hashing function, a unique hashing key for use with the hashing function, a secure tweak, and tokenization. A hashing function is used to generate the secure tweak. The FPE algorithm uses the unique encryption key and the tweak to encrypt parts (or all of) the cleartext input. The system 100 also creates tokens and to de-tokenize those tokens. The system 100 can also verify the integrity of the unique encryption key and any inputs used to generate the secure tweaks. For example, the system 100 can use external lookup tables for unique encryption keys and secure tweaks.

The integrity check may allow only used values that are listed as possible to be used by the system 100. The system 100 can be internally configured or externally configured using parameters in a tokenization request. The configuration parameters may select the requested access control policy to be referenced, the method of tweak assignment, the method of key assignment, the desired token character set, and the format of the token, referred to herein as a token format schema.

According to the configuration, the system 100 can enforce one or more operating controls the secure FPE tokenization process comprising an external access control policy, tweak assignment instructions, encryption key assignment instructions, encoding instructions, and token format schema. In one embodiment, the access control policy determines the permissions granted and denied to the requesting endpoint. Tweak assignment instructions can inform the system 100 about what method of tweak assignment should be used. In a token format where the token retains some parts of the original input data, the concatenation of these parts can be used to generate the secure tweak.

In more detail, the system 100 implements a unique process of FPE to improve the security of FPE while allowing for a vaultless implementation, as will be described in greater detail herein. In various embodiments, the token has a preserved format or the system 100 can use the token to construct a format-preserved and encrypted version of the cleartext. That is, in some instances, the entire cleartext is subjected to FPE and tokenization and in other instances the only a portion of the cleartext is subjected to FPE and tokenization and the token is combined with the remaining portions of the cleartext. Each of these examples will be described in greater detail herein.

According to some embodiments, the system 100 receives cleartext input to be secured from the first endpoint 102. In one example, the cleartext input is [1,2,3,4,5,6,7,8,9,0,0,1, 1,2,3,4], which represents a fictitious credit card number having sixteen digits. In accordance with requirements established between an operator of the first endpoint 102 and an operator of the system 100, the parties establish a token schema that specifies that only digits seven through twelve (789001) are securely FPE tokenized while the first six digits (123456) and last four digits (1234) remain as cleartext. The first six digits are referred to as a prefix and the last four digits are referred to as a suffix in some embodiments.

According to some embodiments, the token format schema can include only a portion of the cleartext input to be used as the tweak input value for the secure tweak. For example, only the first four digits are used. In another embodiment, none of the cleartext input is used to seed the secure tweak generation process. In these embodiments a tweak input can be provided by an endpoint or a tweak input can be randomly generated by the table encoding module 108. The randomly generated tweak input can be stored by the system 100 for later use.

In one example embodiment, the table encoding module 108 will receive the cleartext input and identify a first data set of the cleartext input. In general, the first data set includes any part or the whole of the cleartext input that will be securely FPE tokenized. In this example, the table encoding module 108 will identify seven through twelve (789001) as the first data set.

In some embodiments, the table encoding module 108 encodes first data set of the cleartext input using a lookup table. For example, the table encoding module 108 applies a lookup table to first data set [7,8,9,0,0,1] to produce encoded input data such as [9,0,5,2,2,4]. Generally, this is referred to as encoding a first data set to produce encoded input data.

It will be understood that the lookup table used to transform the first data set into the encoded input data can be entity specific. For example, the entity associated with the first endpoint 102 can be associated with a unique lookup table. The system 100 can maintain a set of lookup tables that are linked to specific endpoints, users, or administrators. In some embodiments, the system 100 is configured to identify a party (endpoint) requesting tokenization and then obtain one or more lookup tables associated with the party.

Thus, the table encoding module 108 of the system 100 can maintain a unique lookup table for each endpoint or entity using the system 100. To be sure, while one round of lookup table transformation has been disclosed, it will be understood that any number of rounds of lookup table transformation can be used. In some embodiments, the table encoding module 108 can shuffle contents of the unique lookup table using output of a random number generator. In some embodiments, the table encoding module 108 can shuffle contents of the unique lookup table each time it is used or for each round of transposition used. In some embodiments, the shuffling of the lookup table can include shifting or mixing of transposition characters in the lookup table. For example, if the lookup table included transposition characters [7,8,6,5,4] which correspond to [1,2,3,4,5]. In this example, when a digit or character of cleartext input equals 1, it is replaced with 7. The lookup table can be shuffled [8,6,7,4,5] such that when a digit or character of cleartext input equals 1, it is replaced with 8. The lookup table can have fewer or more transposition characters than those illustrated in this example. Also, the transposition characters need not be numerical and can include any type of character.

The table encoding module 108 can maintain a count of transformations performed, which can be used in a detokenization/decryption process in order to obtain the first data set. In one or more embodiments, the endpoint can maintain a unique lookup table for each entity that it services. For example, if the endpoint processes social security numbers, the endpoint can maintain a unique lookup table for each entity for which it maintains social security numbers.

Once the encoded input data is generated, the tweak generator module 110 builds a secure tweak that can be used as an input to an FPE algorithm. In more detail, the tweak generator module 110 can utilize any portion of the cleartext input to generate the secure tweak This portion of the cleartext input is generally referred to as a tweak input. In some embodiments, the tweak generator module 110 utilizes only one or more portions of the cleartext input that are not subject to secure FPE tokenization. For example, the tweak generator module 110 can obtain the first six and last four digits of the cleartext input, which in this example includes [1,2,3,4,5] and [1,2,3,4]. In some embodiments, the tweak generator module 110 concatenates these values together to produce [1,2,3,4,5,1,2,3,4], which is generally referred to as a tweak input as noted above. The tweak generator module 110 can encode or transform the tweak input into a byte array [1,0,9,6,4,7,1,0,9,6] using a lookup table. This process involves encoding a tweak input to produce an encoded tweak input. That is, the byte array is generally referred to as the encoded tweak input.

In some embodiments, rather than using a secure tweak generated from part of the cleartext input, the tweak input and its corresponding encoded tweak input can be created from a user-provided value. For example, one or more of the endpoints can provide their own tweak input. This could include any value of a specific character length. Thus, the tweak input that is user-defined can be also be converted into a byte array as noted above using a lookup table. In various embodiments, the endpoint can provide a new tweak input for each round of encoding that is performed.

In some embodiments, the lookup table used to transform the tweak input is the same table used to generate the encoded input data. In other embodiments, the lookup table used to transform the tweak input is a different table than that which was used to generate the encoded input data.

In sum, a secure tweak will be understood to include a value that has been generated using a unique set of information that is obtained from the cleartext input (or user-provided input), where this value has been encoded into a byte array, and the byte array has been subsequently encoded using a keyed hashing function (or another equivalent). In another embodiment, the unique set of information is not obtained from the cleartext input but is another unique set of information used to seed the secure tweak generation process. This type of process is valuable in embodiments where all of the cleartext input is encoded and tokenized, as will be discussed in greater detail infra.

In some embodiments, the secure tweak can be a direct secure tweak that is used directly in the format-preserving encryption algorithm. The secure tweak can be assigned by referencing a separate tweak lookup table. The secure tweak can also be constructed by performing an HMAC (keyed-hash message authentication code or hash-based message authentication code) function on a tweak input and using the result of the HMAC function. This process is generally referred to as hashing the encoded tweak input along with a unique hashing key to generate the secure tweak.

According to some embodiments, the tweak generator module 110 can generate a secure tweak using the encoded tweak input and a unique encryption key that is specific to the first endpoint 102. This process can include the tweak generator module 110 applying a HMAC function (keyed-hash message authentication code or hash-based message authentication code) to a set that includes the encoded tweak input and the unique encryption key. This process can utilize any known HMAC function, such as HMAC SHA256. In this example, when the HMAC function is applied to the encoded tweak input and the unique encryption key, a secure tweak is produced.

Broadly speaking, this process is encompasses generating a secure tweak for the encoded input data based on a token format schema. That is, the HMAC function with inputs such as the encoded tweak input and the unique encryption key are used to generate the secure tweak.

Once the secure tweak is produced, the FPE module 112 is executed to generate ciphertext output. In various embodiments, the FPE module 112 executes an FPE algorithm using the encoded input data, the secure tweak, and the unique encryption key. In this example, the ciphertext output includes [15,35,40,16,16,37].

After the ciphertext output is generated, the ciphertext output is then tokenized using the tokenization module 114. The tokenization module 114 thus encodes the ciphertext output into a token, which in this instance includes kJjnnZ. It will be understood that the tokenization module 114 can utilize any suitable method for tokenization and the token can include any character type allow in the tokenization method that can include numerals, alphabetic characters, symbols, and even arbitrary characters such as emojis and the like. Any alphabet or other set of characters can be incorporated into a lookup table and shuffled to encode a specific data element. Thus, while some embodiments are illustrated where In some embodiments, the tokenization process comprises using another lookup table to encode the ciphertext. Thus, in some embodiments, three separate lookup tables can be used in accordance with the present disclosure. In other embodiments, a single unique lookup table can be used. In yet other embodiments, two lookup tables can be used, where a first lookup table is used for encoding the first data set and encoding the tweak input into a byte array. As second lookup table is used to encode the ciphertext into a token.

In various embodiments, the tokenization module 114 is configured to construct an assembled token using the generated token. It will be understood that the assembled token has a format that is preserved relative to the cleartext input 114. In this example, the tokenization module 114 would obtain the first six digits of the cleartext input 114 and concatenate these first six digits with the token and the last four digits of the cleartext input 114. This would produce an assembled token of [123456kJjnnZ1234] having a format that is sixteen digits in length. Thus, [123456kJjnnZ1234] is a secure, FPE tokenized equivalent of [1234567890011234]. This is generally referred to as applying a format preserving encryption algorithm that utilizes the encoded input data, the secure tweak, and a unique encryption key to generate ciphertext output. In some embodiments, the process further includes encoding the ciphertext output of the FPE process into a token as noted above to produce the token kJjnnZ. This can be accomplished using a lookup table in some embodiments.

The assembled token [123456kJjnnZ1234] can be used in any desired process. For example, the assembled token [123456kJjnnZ1234], which represents a credit card, can be exchanged between the first endpoint 102 and the second endpoint 104 without exposing the cleartext input to malicious or unintended interference. Furthermore, using the systems and methods disclosed herein, no party to any part of the process is required to retain the cleartext input to request or recover the cleartext input at a later date, such as during a transaction between the first endpoint 102 and the second endpoint 104.

Generally speaking, specific aspects of the secure FPE tokenization method used above to generate the assembled token, as well as the one or more lookup tables and unique encryption key that were used in the various processes disclosed above are referred to as secure FPE tokenization schema. Rather than requiring storage of the underlying cleartext input, the system 100 only need know the secure FPE tokenization schema to recover the cleartext input from an assembled token. The system 100 is never required to store the cleartext input. This technical solution encompasses a practical application of both FPE and tokenization to reduce or mitigate data privacy and security issues. That is, if no cleartext is stored and FPE is utilized, a malicious actor can never recover the cleartext input even if they happen to receive the assembled token.

The following paragraphs describe a detokenization and decryption process for obtaining cleartext input from an assembled token as described above. The system 110 can utilize a reversal of the process described above to recover the cleartext input from the assembled token.

According to some embodiments, an entity desires to obtain cleartext corresponding to an assembled token. In one example embodiment, the first endpoint 102 uses the system 100 to store credit card numbers of their customers as tokens. When the first endpoint 102 needs the cleartext of the credit card, the first endpoint 102 requests the system 100 to detokenize and decrypt the assembled token for a customer. Using the example above, the system 100 will perform a detokenization and decryption process on the assembled token [12345611nnZ1234]. As the system 100 knows the token schema established for the first endpoint 102. The table encoding module 108 can extract the cleartext portions of the assembled token [12345611nnZ1234], which includes the first six and last four digits. Using the unique lookup table used to encode the first data set of the cleartext input, the table encoding module 108 can recover the ciphertext of [15,35,40,16,16,37].

Next, the system 100 regenerates the secure tweak using the first six and last four digits extracted from the assembled token. That is, the tweak generator module 110 is executed to generate the secure tweak using a lookup table transformation and the HMAC function that was previously used to generate the secure tweak. Thus, the tweak generator module 110 applies the HMAC function to the byte array and the unique encryption key to recover the ciphertext [15,35,40, 16,16,37]

The FPE module 112 is then executed to recover the encoded input data by applying an FPE algorithm (the FPE algorithm used above) to the ciphertext [15,35,40,16,16,37], the secure tweak, and the unique encryption key to recover the encoded input data [9,0,5,2,2,4].

Next, the encoded input data [9,0,5,2,2,4] is decoded to recover the first data set, using the lookup table used to encode the first data set into the encoded input data. Once the first data set is recovered, the system 100 can recreate the cleartext input.

Figure 2:
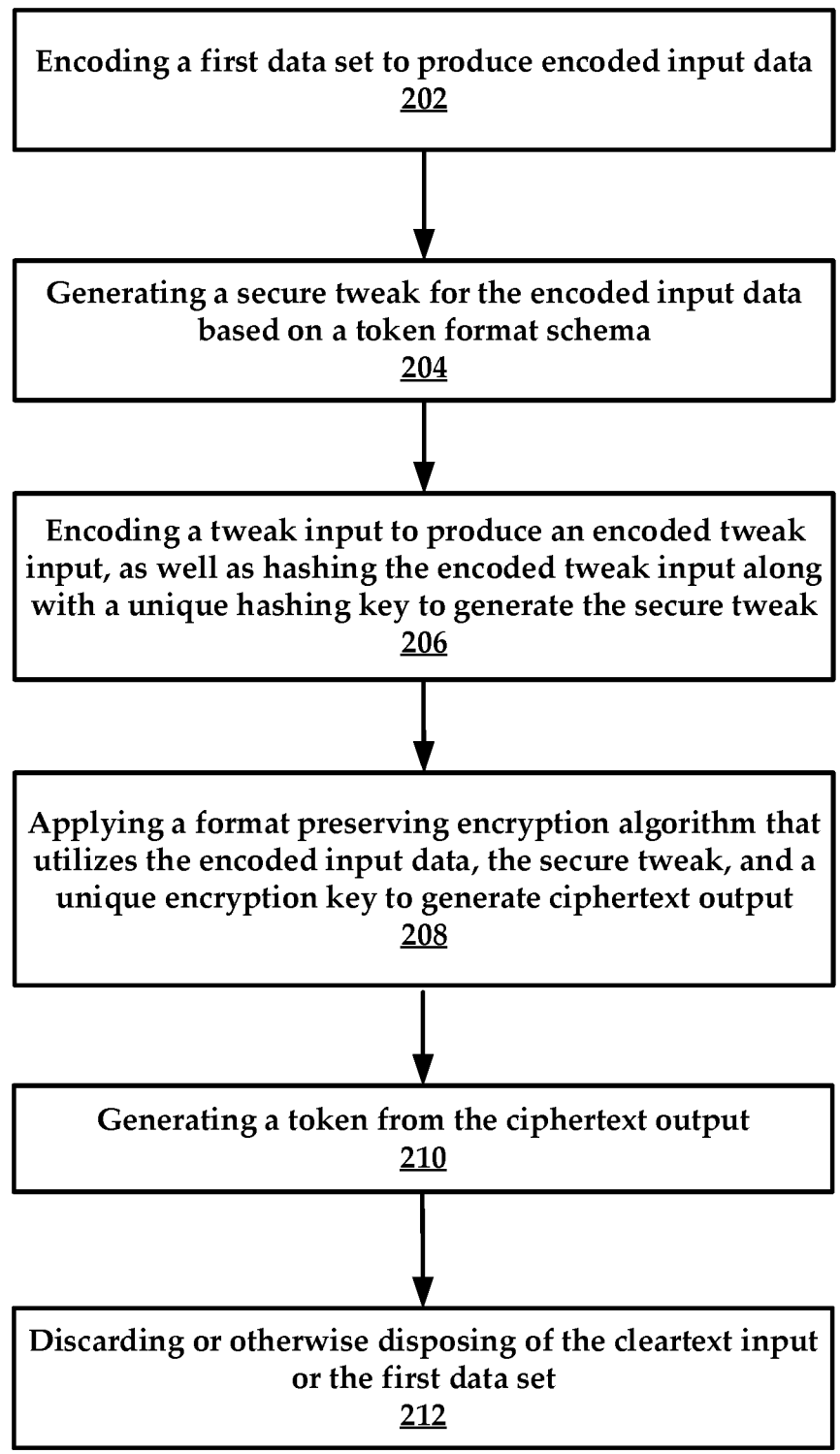
FIG. 2 is a flow diagram of an example method of the present disclosure.

FIG. 2 illustrates an example flowchart of a method of the present disclosure. In general, the method involves transforming cleartext input into a token in a manner where the cleartext input need not be retained. The method includes a step 202 of encoding a first data set to produce encoded input data. As noted above, the first data set could include the entirety of the cleartext input or could include only a portion of the cleartext input.

The method also includes a step 204 of generating a secure tweak for the encoded input data based on a token format schema. In some embodiments, the secure tweak can be generated using a tweak input or seed that is obtained from an entity/endpoint. For example, a company that desires to process credit cards for customers can provide a tweak input that includes a code that is unique to the company. This type of a tweak input is referred to as an entity-provided value.

In another example embodiment, the tweak input is created from one or more portions of the cleartext input. For example, the tweak input can be created from any portion of the cleartext input that will not eventually be encrypted and/or tokenized. In these embodiments, the method includes a step 206 of encoding a tweak input to produce an encoded tweak input, as well as hashing the encoded tweak input along with a unique hashing key to generate the secure tweak.

Next, the method includes a step 208 of applying a format preserving encryption algorithm that utilizes the encoded input data, the secure tweak, and a unique encryption key to generate ciphertext output. The method also includes a step 210 of generating a token from the ciphertext output. In various embodiments, the method includes a step 212 of discarding or otherwise disposing of the cleartext input or the first data set. Thus, no party to this process retains the cleartext input. The cleartext input is only recoverable using the recovery process or method disclosed and illustrated in FIG. 3. The first data set or a cleartext input can be discarded using any means that results in the first data set or the cleartext input being permanently inaccessible such as through deletion. To be sure, no copy of the first data set or a cleartext input are stored after the token is generated.

In various embodiments, such as when the first data set and its corresponding token are generated from a portion of the cleartext input, the token can be included in an assembled token. That is, parts of the cleartext input that were not tokenized can be combined with the token to generate an assembled token that has a format or length that is preserved relative to the cleartext input. Thus, if the cleartext input has eight characters, the assembled token (which includes the token) will also have eight characters.

As noted above, encoding processes disclosed herein can be facilitated using one or more lookup tables. In various embodiments, each distinct encoding step can include a unique lookup table. In some instances, a single lookup table is used, but the contents of the lookup table are shuffled in each subsequent use of the lookup table. For example, if a lookup table (Table 3A) includes:

TABLE 3A

| 1 | 2 | 3 | 4 |
| 4 | 7 | 3 | 0 | when shuffled Table 3A would create Table 3B below:

TABLE 3B

| 1 | 2 | 3 | 4 |
| 2 | 1 | 5 | 7 |

In these tables, the top row includes numbers that will be replaced and the lower row includes numbers that will replace the numbers in the top row. The lookup table can be shuffled as many times as needed or desired. In some embodiments, the lookup table is never shuffled and can be reused as desired. In some embodiments, the token schema or system will track a count of the number of uses of the lookup table. When decrypting, the system can use the count to determine a number of times the lookup table can be used in reverse to recover the cleartext input.

Figure 3:
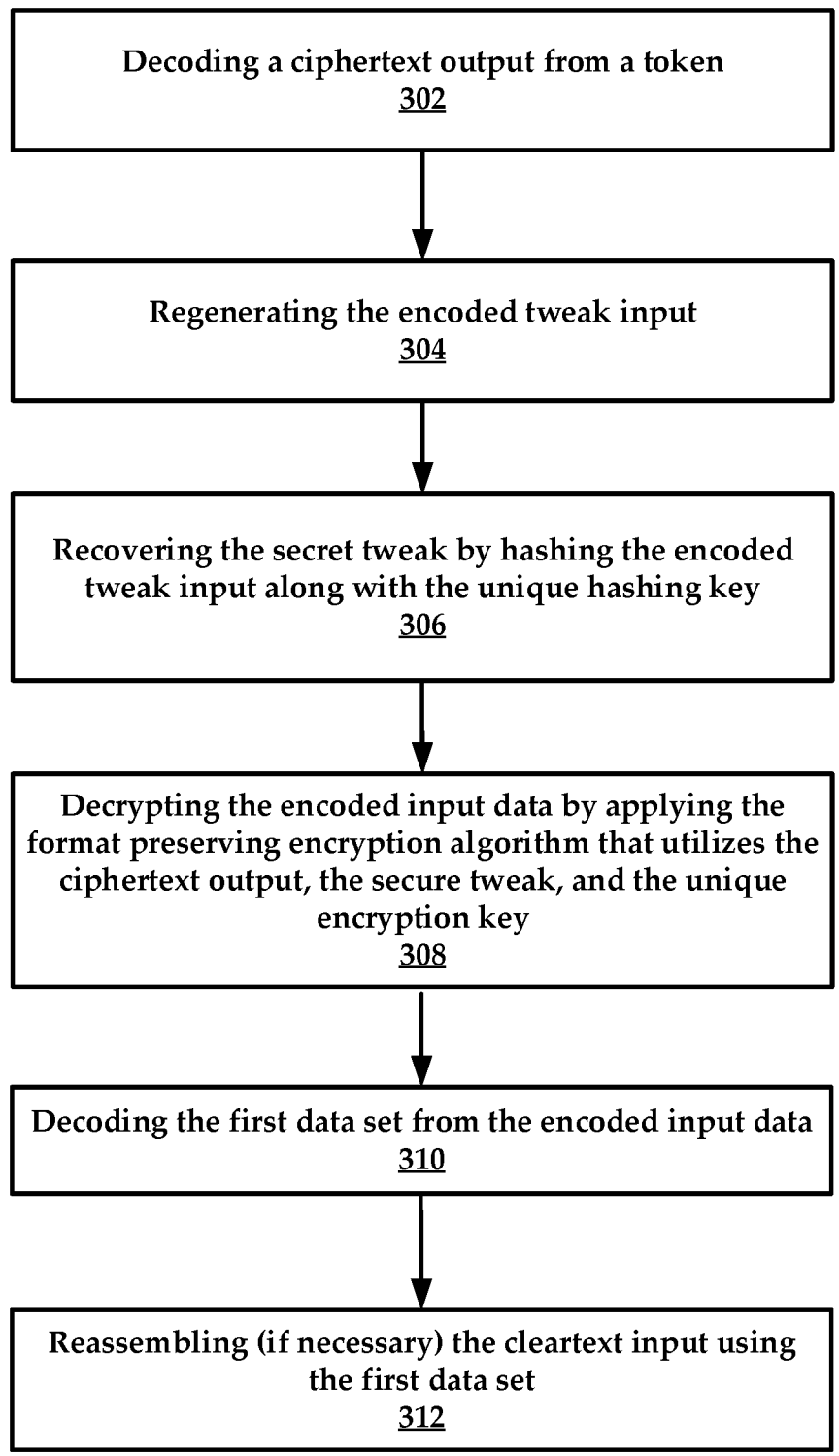
FIG. 3 is a flow diagram of another example method of the present disclosure.

FIG. 3 illustrates another example method that includes a process for recovering cleartext input from an assembled token or other token generated in accordance with embodiments of the present disclosure. The process generally includes using a token format schema that was used to produce the token, which includes aspects such as what portions or parts of the cleartext input were used (if any) to generate the secret tweak (such as the tweak input) and the lookup table(s) used for encoding data at various steps in the tokenization process. The token format schema can also identify any encryption keys that will be used during encryption or decryption steps. In some embodiments, a unique hashing key and a unique encryption key are utilized.

The method generally includes a step 302 of decoding a ciphertext output from a token. This can include utilizing a lookup table used to encode the ciphertext output into the token. Next, the method includes a step 304 of regenerating the encoded tweak input. This can include obtaining parts of the cleartext input that are not tokenized or using an endpoint or end-user defined tweak input. Again, the identification or assembly of the encoded tweak input is dictated by the token format schema. Once the encoded tweak input is regenerated, the method includes a step 306 of recovering the secret tweak by hashing the encoded tweak input along with the unique hashing key.

Next, the method include a step 308 of decrypting the encoded input data by applying the format preserving encryption algorithm that utilizes the ciphertext output, the secure tweak, and the unique encryption key. This includes the format preserving encryption algorithm used in step 208 of FIG. 2. In one or more embodiments, the method includes a step 310 of decoding the first data set from the encoded input data, as well as a step 312 of reassembling (if necessary) the cleartext input using the first data set. In some embodiments, such as when the entire cleartext input is tokenized, reassembly is not necessary as the entire cleartext input is recovered during detokenization, and subsequent decryption and decoding.

Figure 4:
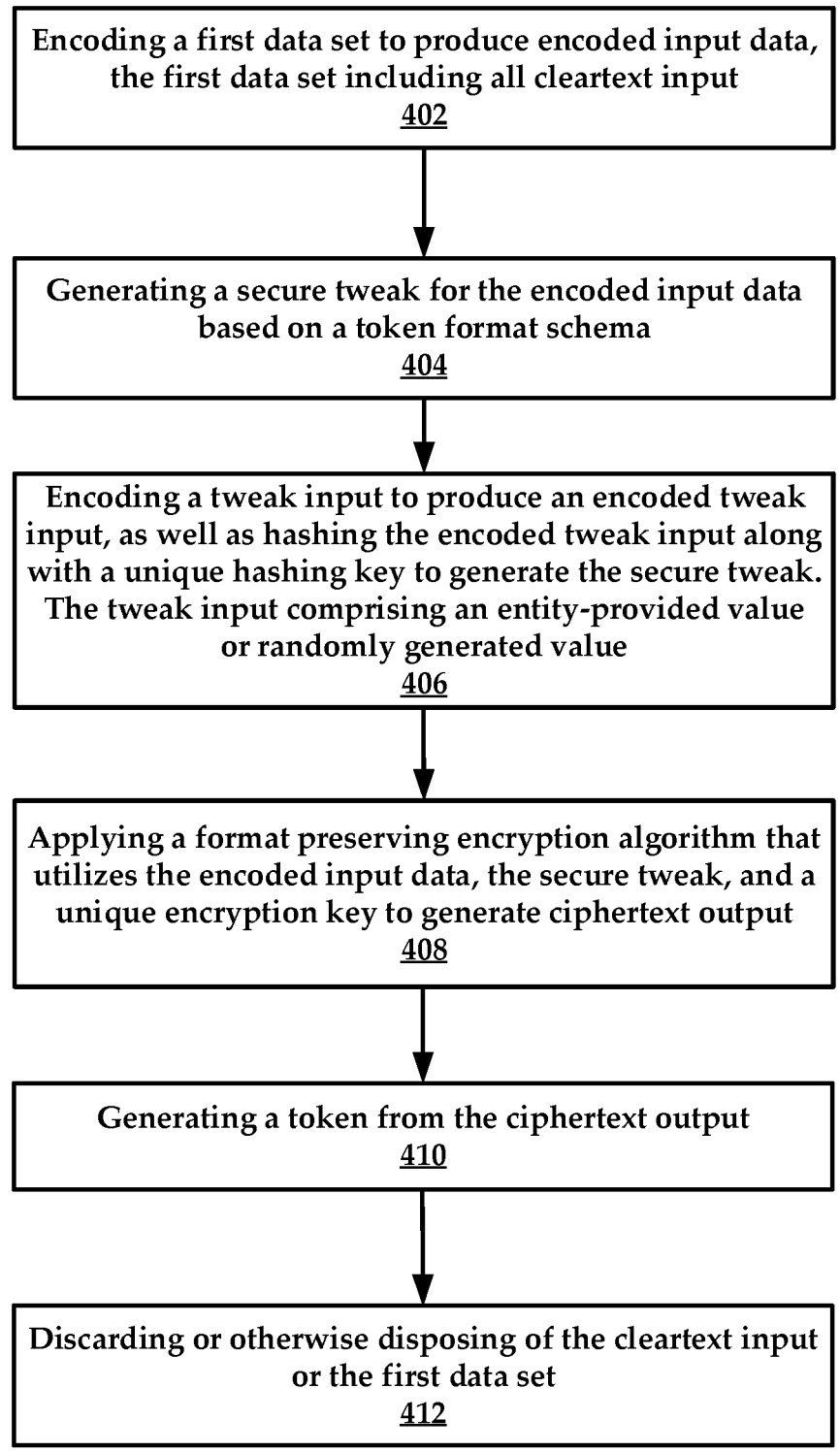
FIG. 4 is a flow diagram of yet another example method of the present disclosure.

FIG. 4 illustrates an example flowchart of another method of the present disclosure. In general, the method involves transforming cleartext input into a token in a manner where the cleartext input need not be retained. This method differs from that of FIG. 2 because a tweak input used to generate a secure tweak is not obtained from cleartext input.

The method includes a step 402 of encoding a first data set to produce encoded input data. In this specific embodiment, the first data set includes all parts of a cleartext input.

The method also includes a step 404 of generating a secure tweak for the encoded input data based on a token format schema. In some embodiments, the secure tweak can be generated using a tweak input or seed that is obtained from an entity/endpoint. For example, a company that desires to process credit cards for customers can provide a tweak input that includes a code that is unique to the company. This type of a tweak input is referred to as an entity-provided value. The tweak input can also be randomly generated by the system using a seed value that is unique for the endpoint.

Next, the method includes a step 408 of applying a format preserving encryption algorithm that utilizes the encoded input data, the secure tweak, and a unique encryption key to generate ciphertext output. The method also includes a step 410 of generating a token from the ciphertext output. In various embodiments, the method includes a step 412 of discarding or otherwise disposing of the cleartext input or the first data set. Thus, no party to this process retains the cleartext input. The cleartext input is only recoverable using the recovery process or method disclosed and illustrated in FIG. 5.

Figure 5:
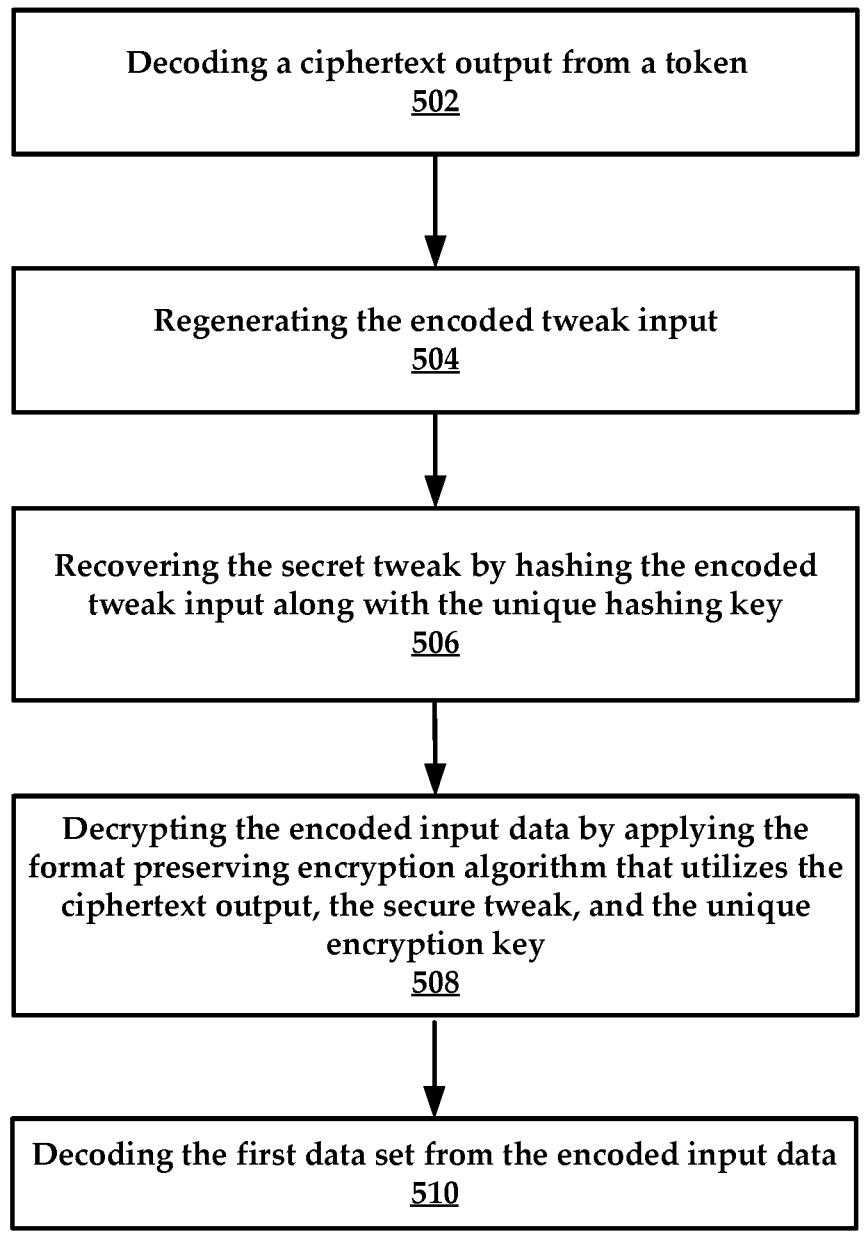
FIG. 5 is a flow diagram of a decoding method of the present disclosure.

FIG. 5 illustrates another example method that includes a process for recovering cleartext input from an assembled token or other token generated in accordance with embodiments of the present disclosure. The process generally includes using a token format schema that was used to produce the token, which includes aspects such as what portions or parts of the cleartext input were used (if any) to generate the secret tweak (such as the tweak input) and the lookup table(s) used for encoding data at various steps in the tokenization process. The token format schema can also identify any encryption keys that will be used during encryption or decryption steps. In some embodiments, a unique hashing key and a unique encryption key are utilized.

The method generally includes a step 502 of decoding a ciphertext output from a token. This can include utilizing a lookup table used to encode the ciphertext output into the token. Next, the method includes a step 504 of regenerating the encoded tweak input. This can include utilizing the entity-provided value. Once the encoded tweak input is regenerated, the method includes a step 506 of recovering the secret tweak by hashing the encoded tweak input along with the unique hashing key.

Next, the method include a step 508 of decrypting the encoded input data by applying the format preserving encryption algorithm that utilizes the ciphertext output, the secure tweak, and the unique encryption key. This includes the format preserving encryption algorithm used in step 408 of FIG. 2. In one or more embodiments, the method includes a step 510 of decoding the first data set from the encoded input data to recover the cleartext input.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

EXAMPLE EMBODIMENTS

In some instances, the following examples may be implemented together or separately by the systems and methods described herein. Some embodiments, the present disclosure includes a method that includes encoding a first data set to produce encoded input data, generating a secure tweak for the encoded input data based on a token format schema by encoding a tweak input to produce an encoded tweak input; and hashing the encoded tweak input along with a unique hashing key to generate the secure tweak, applying a format preserving encryption algorithm that utilizes the encoded input data, the secure tweak, and a unique encryption key to generate ciphertext output, and encoding the ciphertext output into token. Some embodiments include receiving a cleartext input, wherein the first data set is a part of the cleartext input. In various embodiments, the tweak input comprises another part of the cleartext input. In one or more embodiments, the secure tweak is created from one or more portions of the cleartext input that are not tokenized. In various embodiments, the secure tweak is created from an entity-provided value. In one or more embodiments, the first data set is encoded into the encoded input data using a first lookup table, wherein the first lookup table is unique to an entity that provided the cleartext input. According to some embodiments, the tweak input is encoded using a second lookup table. In various embodiments, generating the token from the ciphertext output includes using a third lookup table to convert the ciphertext output into the token. Moreover, generating the token from the ciphertext output may further comprise assembling an assembled token as a concatenation of the one or more portions of the cleartext input that are not tokenized and the token, as specified in the token format schema. In one or more embodiments, the third lookup table comprises alphabetic characters, whereas the first lookup table and the second lookup table comprise numeric characters. In various embodiments, the method includes decoding the ciphertext output from the token, regenerating the encoded tweak input, recovering the secret tweak by hashing the encoded tweak input along with the unique hashing key, decrypting the encoded input data by applying the format preserving encryption algorithm that utilizes the ciphertext output, the secure tweak, and the unique encryption key, decoding the first data set from the encoded input data, and reassembling the cleartext input using the first data set.

According to one or more embodiments, the present disclosure includes a processor and memory for storing executable instructions. The processor is configured to execute the instructions to encode a first data set to produce encoded input data, generate a secure tweak for the encoded input data based on a token format schema by encoding a tweak input to produce an encoded tweak input; and hash the encoded tweak input along with a unique hashing key to generate the secure tweak; applying a format preserving encryption algorithm that utilizes the encoded input data, the secure tweak, and a unique encryption key to generate ciphertext output; generating a token from the ciphertext output; and discard the first data set or a cleartext input that comprises the first data set. In one or more embodiments, the processor is further configured to encode the first data set using a lookup table. In other embodiments, the processor is further configured to encode the tweak input using the lookup table. In one embodiment, the processor is further configured to generate the token from the ciphertext output using the lookup table. In yet other embodiments, the processor is further configured to decode the ciphertext output from the token using the lookup table, regenerate the encoded tweak input, recover the secret tweak by hashing the encoded tweak input along with the unique hashing key, decrypt the encoded input data by applying the format preserving encryption algorithm that utilizes the ciphertext output, the secure tweak, and the unique encryption key, decode the first data set from the encoded input data; and reassemble the cleartext input using the first data set.

According to various embodiments, the present disclosure is directed to a method including encoding a first data set of a cleartext input to produce encoded input datan encoding a tweak input to produce an encoded tweak input, hashing the encoded tweak input along with a unique hashing key to generate a secure tweak; applying a format preserving encryption algorithm that utilizes the encoded input data, the secure tweak, and a unique encryption key to generate ciphertext output, generating a token from the ciphertext output, receiving a request to obtain the cleartext input, decoding the ciphertext output from the token, regenerating the encoded tweak input, recovering the secret tweak by hashing the encoded tweak input along with the unique hashing key, decrypting the encoded input data by applying the format preserving encryption algorithm that utilizes the ciphertext output, the secure tweak, and the unique encryption key, decoding the first data set from the encoded input data, and reassembling the cleartext input using the first data set.

What is claimed is:

1. A method, comprising:
   receiving a cleartext input;
   encoding a first data set to produce encoded input data, wherein the first data set is a part of the cleartext input, wherein the first data set is encoded into the encoded input data using a first lookup table, the first lookup table being unique to an entity that provided the cleartext input;
   generating a secure tweak for the encoded input data based on a token format schema by:
      encoding a tweak input using a second lookup table to produce an encoded tweak input, wherein the tweak input comprises another part of the cleartext input; and
      hashing the encoded tweak input along with a unique hashing key to generate the secure tweak, the secure tweak being created from one or more portions of the cleartext input that are not tokenized which are a value provided by the entity;
   applying a format preserving encryption algorithm that utilizes the encoded input data, the secure tweak, and a unique encryption key to generate ciphertext output; and
   encoding the ciphertext output into token.

2. The method according to claim 1, wherein generating the token from the ciphertext output includes using a third lookup table to convert the ciphertext output into the token.

3. The method according to claim 2, wherein generating the token from the ciphertext output further comprises assembling an assembled token as a concatenation of the one or more portions of the cleartext input that are not tokenized and the token, as specified in the token format schema.

4. The method according to claim 2, wherein the third lookup table comprises alphabetic characters, whereas the first lookup table and the second lookup table comprise numeric characters.

5. The method according to claim 1, further comprising:
decoding the ciphertext output from the token;
regenerating the encoded tweak input;
recovering the secure tweak by hashing the encoded tweak input along with the unique hashing key;
decrypting the encoded input data by applying the format preserving encryption algorithm that utilizes the ciphertext output, the secure tweak, and the unique encryption key;
decoding the first data set from the encoded input data; and
reassembling the cleartext input using the first data set.

6. A system, comprising:
a processor; and
memory for storing executable instructions, the processor being configured to execute the instructions to:
receive a cleartext input;
encode a first data set to produce encoded input data, wherein the first data set is a part of the cleartext input, wherein the first data set is encoded into the encoded input data using a first lookup table, the first lookup table being unique to an entity that provided the cleartext input;
generate a secure tweak for the encoded input data based on a token format schema by:
  encode a tweak input using a second lookup table to produce an encoded tweak input, wherein the tweak input comprises another part of the cleartext input; and
  hash the encoded tweak input along with a unique hashing key to generate the secure tweak, the secure tweak being created from one or more portions of the cleartext input that are not tokenized which are a value provided by the entity;
apply a format preserving encryption algorithm that utilizes the encoded input data, the secure tweak, and a unique encryption key to generate ciphertext output;
generate a token from the ciphertext output; and
discard the first data set or a cleartext input that comprises the first data set.

7. The system according to claim 6, wherein the processor is further configured to
decode the ciphertext output from the token using the lookup table;
regenerate the encoded tweak input;
recover the secure tweak by hashing the encoded tweak input along with the unique hashing key;
decrypt the encoded input data by applying the format preserving encryption algorithm that utilizes the ciphertext output, the secure tweak, and the unique encryption key;
decode the first data set from the encoded input data; and
reassemble the cleartext input using the first data set.

8. A method, comprising:
encoding a first data set of a cleartext input to produce encoded input data, wherein the first data set is encoded into the encoded input data using a first lookup table, the first lookup table being unique to an entity that provided the cleartext input;
encoding a tweak input using a second lookup table to produce an encoded tweak input, wherein the tweak input comprises another part of the cleartext input;
hashing the encoded tweak input along with a unique hashing key to generate a secure tweak, the secure tweak being created from one or more portions of the cleartext input that are not tokenized which are a value provided by the entity;
applying a format preserving encryption algorithm that utilizes the encoded input data, the secure tweak, and a unique encryption key to generate ciphertext output;
generating a token from the ciphertext output;
receiving a request to obtain the cleartext input;
decoding the ciphertext output from the token;
regenerating the encoded tweak input;
recovering the secure tweak by hashing the encoded tweak input along with the unique hashing key;
decrypting the encoded input data by applying the format preserving encryption algorithm that utilizes the ciphertext output, the secure tweak, and the unique encryption key;
decoding the first data set from the encoded input data; and
reassembling the cleartext input using the first data set.

* * * * *